United States Patent
Bateman et al.

(10) Patent No.: US 7,098,810 B2
(45) Date of Patent: Aug. 29, 2006

(54) AIRCRAFT AUTORECOVERY SYSTEMS AND METHODS

(75) Inventors: Charles D. Bateman, Bellevue, WA (US); John H. Gover, Bellevue, WA (US); Steven C. Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 196 days.

(21) Appl. No.: 10/782,055

(22) Filed: Feb. 19, 2004

(65) Prior Publication Data

US 2004/0215372 A1 Oct. 28, 2004

Related U.S. Application Data

(60) Provisional application No. 60/472,350, filed on May 20, 2003, provisional application No. 60/464,861, filed on Apr. 22, 2003.

(51) Int. Cl.
*G08B 23/00* (2006.01)
(52) U.S. Cl. .............. 340/963; 701/9; 701/11; 701/301; 244/197
(58) Field of Classification Search ........ 340/945–970; 701/9–11, 14, 301, 302; 244/196, 197
See application file for complete search history.

(56) References Cited

U.S. PATENT DOCUMENTS

| | | | |
|---|---|---|---|
| 4,224,669 A | | 9/1980 | Brame |
| 4,775,116 A * | | 10/1988 | Klein .................... 244/76 R |
| 4,910,513 A * | | 3/1990 | Kelly et al. ............. 340/966 |
| 4,924,401 A | | 5/1990 | Bice et al. |
| 5,057,834 A * | | 10/1991 | Nordstrom .............. 340/963 |
| 5,243,339 A * | | 9/1993 | Graham et al. .......... 340/945 |
| 5,839,080 A | | 11/1998 | Muller et al. |
| 5,900,827 A * | | 5/1999 | Graham et al. .......... 340/963 |
| 6,088,654 A | | 7/2000 | Lepere et al. |
| 6,317,690 B1 * | | 11/2001 | Gia ......................... 701/301 |
| 6,356,819 B1 | | 3/2002 | Winslow |
| 6,591,170 B1 * | | 7/2003 | Block et al. ................ 701/9 |
| 6,675,076 B1 | | 1/2004 | Moody |
| 6,675,095 B1 * | | 1/2004 | Bird et al. ............... 701/301 |
| 6,748,325 B1 * | | 6/2004 | Fujisaki .................. 701/301 |
| 6,778,906 B1 * | | 8/2004 | Hennings et al. ........ 701/301 |
| 2003/0034902 A1 | | 2/2003 | Dickaw |
| 2003/0128122 A1 * | | 7/2003 | Reynolds ............... 340/573.1 |

FOREIGN PATENT DOCUMENTS

WO    WO 03/050632 A2    6/2003

\* cited by examiner

*Primary Examiner*—Thomas Mullen
*Assistant Examiner*—Jennifer Mehmood
(74) *Attorney, Agent, or Firm*—Black Lowe & Graham PLLC

(57) ABSTRACT

Methods and systems for performing auto-recovery for an aircraft. An example system includes position and information systems, an automatic flight control system, a database, and a processor. The database includes terrain data, airport data, obstacle data, and protected airspace data. The processor determines if one of a caution alert or a warning alert exists based on data stored in the database and information received from the position and information systems. Auto-recovery instructions are generated and sent to the automatic flight control system if no positive flight control input has been performed at time of expiration of a waiting period. Auto-recovery instructions are generated based on an analysis of two or more auto-recovery routes. The system does not perform auto-recovery if components of the system fail to meet a predefined validity or integrity level.

50 Claims, 12 Drawing Sheets

AIRCRAFT AUTORECOVERY SYSTEMS AND METHODS

PRIORITY CLAIM

This Application claims the benefit of U.S. Provisional applications, Ser. No. 60/464,861, filed Apr. 22, 2003, and Ser. No. 60/472,350, filed May 20, 2003.

FIELD OF THE INVENTION

This invention relates generally to aircraft safety and, more specifically, to methods and systems for automatic recovery of hazardous maneuvers.

BACKGROUND OF THE INVENTION

An obvious intent of any automatic recovery system for almost any aircraft is to prevent ground impact during controlled flight of the aircraft. Many aircraft have standard proximity alarms for alerting pilots to the nearness of ground. These alarms can be based on inadmissible rates of descent of the aircraft or nearness of the ground. While proximity alarms are an improvement over prior systems, they are not a permanent solution to some of the problems that have been shown to cause aircraft ground impacts.

The need for ground collision avoidance extends to a wide variety of aircraft and scenarios ranging from terminal area navigation for commercial airliners to low level navigation, pilot spatial disorientation and g-induced loss of consciousness (G-LOC) for high performance aircraft. While some aircraft have been equipped with ground proximity warning systems. Most of the existing ground proximity warning systems contain no provisions for variations in aerodynamics, but rather rely on the pilot to compensate for these variations by giving him a finite amount of time to recover level flight. At the same time, these systems are passive, relying on pilot awareness and competence to recover from the situation.

Thus, two essential problems remain with proximity warning systems. Firstly, if the pilot or crew is incapacitated, as might occur due to loss of cabin pressure after a bird strike through the cockpit windshield, for example, pilot awareness or ability may not be up to the task of controlling the aircraft and recovering level flight.

An innovative approach to this problem is disclosed in U.S. Pat. No. 4,058,710 to Altman. Altman discloses a process for preventing unwanted contact by an aircraft with land or water. When applied over land the Altman assumes flat terrain or low hills. Altman's process utilizes the aircraft's rate of descent and altitude to compute a limiting altitude, which is further modified by the aircraft's ability for transverse acceleration. This limiting altitude is used to determine when to activate an automatic feedback controller, which provides the aircraft with the maximum feasible transverse acceleration. Thus, Altman attempts to continuously calculate a limiting altitude for the aircraft below which automatic controls will be applied for aircraft recovery. Various theoretical schemes are proposed by Altman for determining this limiting altitude. All of these schemes are difficult to incorporate into an aircraft control design or to simplify in a manner that will not cause spurious effects including nuisance flyups during controlled flight.

The current Enhanced Ground Proximity Warning System (EGPWS) is designed to provide pilots with timely alerts in the event that the airplane is flown towards terrain or an obstacle. The EGPWS alerting algorithms are predicated on the expectation that the response of the pilot to a warning will be a "pull-up", i.e. a maneuver in the vertical plane only. If an aircraft is about to enter restricted airspace, it may not be possible to avoid the airspace by using a "pull-up" maneuver alone. Also, some airspace volumes expand laterally with altitude, and again a "pull-up" will not avoid penetrating the airspace volume.

A need therefore exists for a ground and obstacle collision and protected airspace auto-recovery system that is sufficiently sophisticated to initiate a recovery maneuver when required while avoiding a multitude of nuisance recoveries that interfere with controlled flight and providing smooth recovery maneuvers for crew and passenger safety and comfort.

SUMMARY OF THE INVENTION

The present invention provides methods and systems for performing auto-recovery for an aircraft. An example system includes position and information systems, an automatic flight control system, a database, and a processor. The database includes terrain data, airport data, obstacle data, and protected airspace data. The processor is coupled to the database, the position and information systems, and the automatic flight control system. The processor executes an auto-recovery computer program that determines if one of a caution alert or a warning alert exists based on data stored in the database and information received from the position and information systems. The auto-recovery computer program generates auto-recovery instructions and sends the generated auto-recovery instructions to the automatic flight control system if no positive flight control input has been performed at time of expiration of the waiting period.

In one aspect of the invention, the component for generating an auto-recovery instruction includes a component for analyzing two or more auto-recovery routes relative to one or more of the terrain data, airport data, obstacles data, or protected airspace data.

In another aspect of the invention, the automatic flight control system includes an autopilot system, a fly-by-wire system, flight control actuators, or a stick-puller.

In a further aspect of the invention, the component for determining includes a component for setting an integrity flag high or low and the component for generating sends the auto-recovery signal to the automatic flight control system if the integrity flag is set high. The component for setting an integrity flag sets the integrity flag based on validity information produced by the position and information systems and the database.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
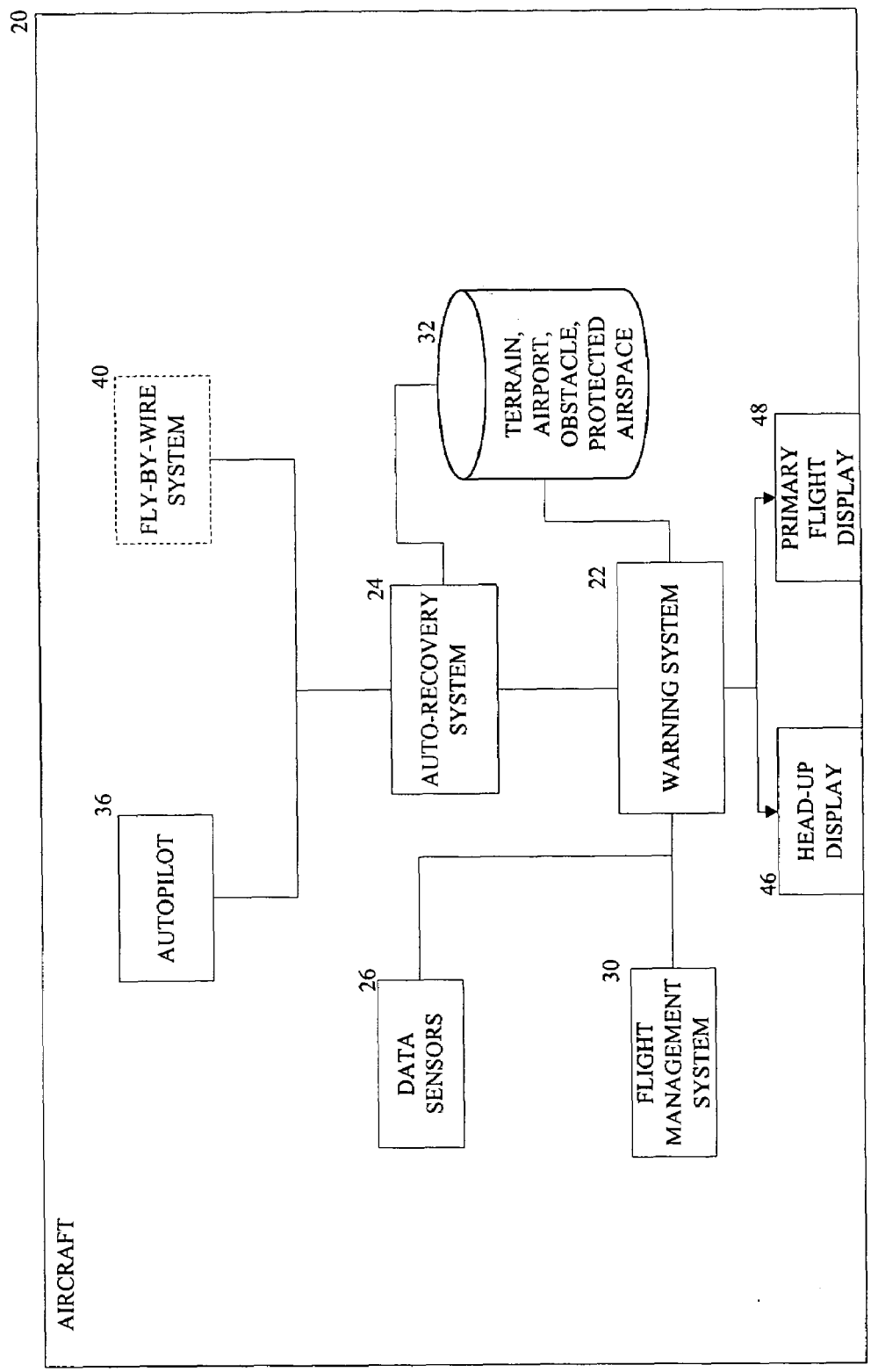
FIG. 1 is a block diagram of an exemplary system formed in accordance with the present invention.

As shown in FIG. 1, an aircraft 20 includes a warning system 22 coupled to an auto-recovery system 24. The warning system 22, such as the Enhanced Ground Proximity Warning System (EGPWS) produced by Honeywell, Inc., is coupled to various aircraft data sensors 26, and a Flight Management System (FMS) 30 or similar flight information systems. An example of a warning system 22 is a ground proximity warning system as shown and described in U.S. Pat. No. 5,839,080 titled Terrain Awareness System, which is hereby incorporated by reference. The warning system 22 is also coupled to a database 32 that may include one or more of a terrain database, an airport database, an obstacle database, and a protected airspace database. The auto-recovery system 24 is also coupled to an autopilot 36 or in an alternate embodiment to a fly-by-wire system 40. An alternate embodiment of the present invention is shown below in FIG. 13.

In one embodiment of the invention, the auto-recovery system 24 sends flight control commands, such as pitch or roll commands, to the autopilot 36 after some predefined period of time has elapsed since a caution or warning has been identified by the warning system 22. In another embodiment, an integrity flag is received at the auto-recovery system 24 from the warning system 22. The integrity flag indicates either high integrity or low integrity. If low integrity is indicated, the auto-recovery system 24 will not perform any auto-recovery maneuvers. However, if the integrity flag is set high, the auto-recovery system 24 will execute auto-recovery if an auto-recovery exists (warning or caution).

In another embodiment, after a caution or warning has been identified and outputted by the warning system 22, the auto-recovery system 24 analyzes a plurality of escape routes, selects the best escape route, and sends corresponding pitch and roll commands to the autopilot 36. This is described in more detail below with respect to the flow diagram of FIG. 2.

Figure 13:
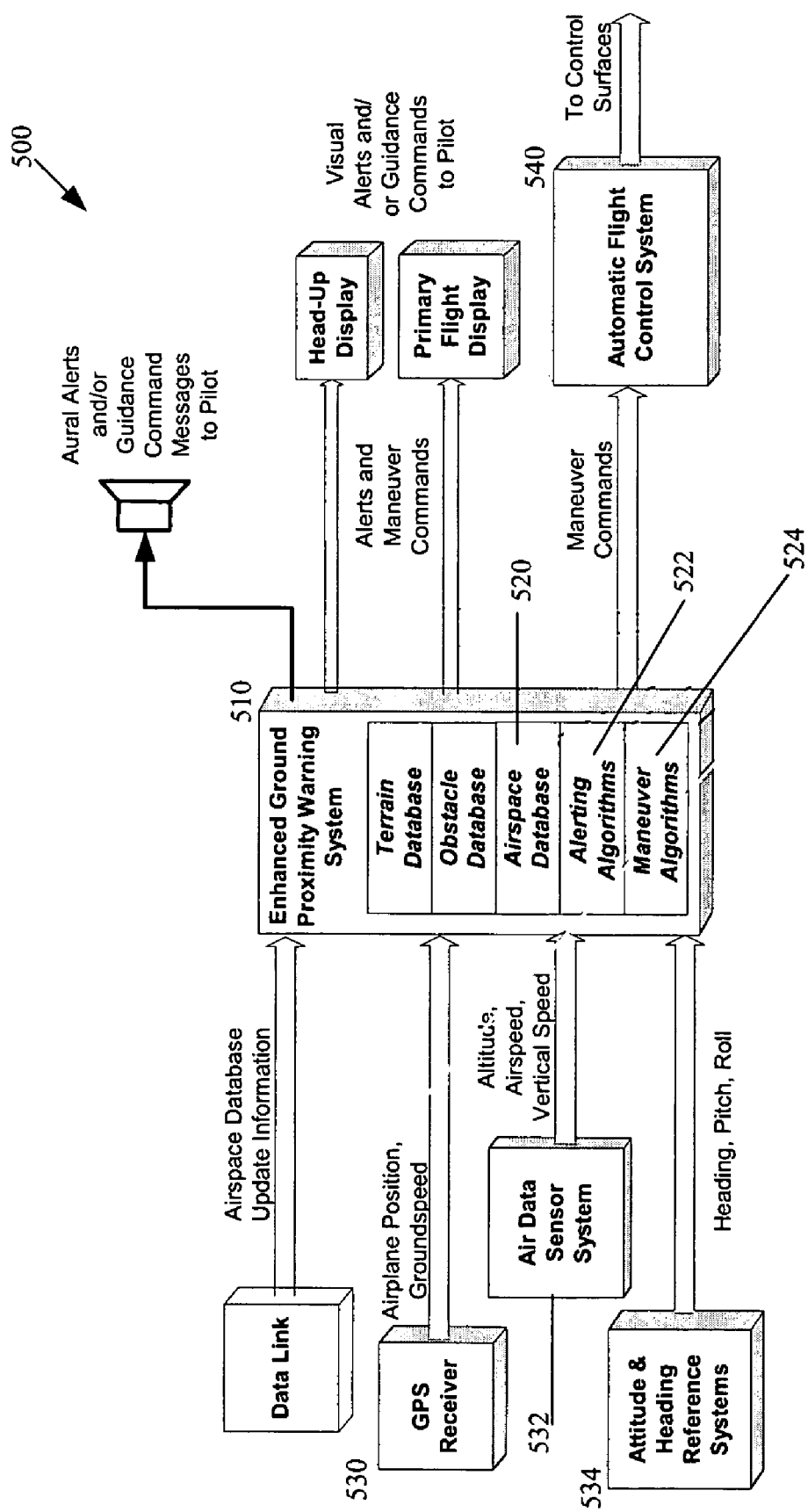
FIG. 13 is block diagram of an exemplary system formed in accordance with an alternate embodiment of the present invention.

The auto-recovery system 24 may be a separate general-purpose computer system that includes internal memory and a processing device that executes an auto-recovery application program stored within the memory or may be implemented as software within the warning system 22 (FIG. 13).

Figure 2:
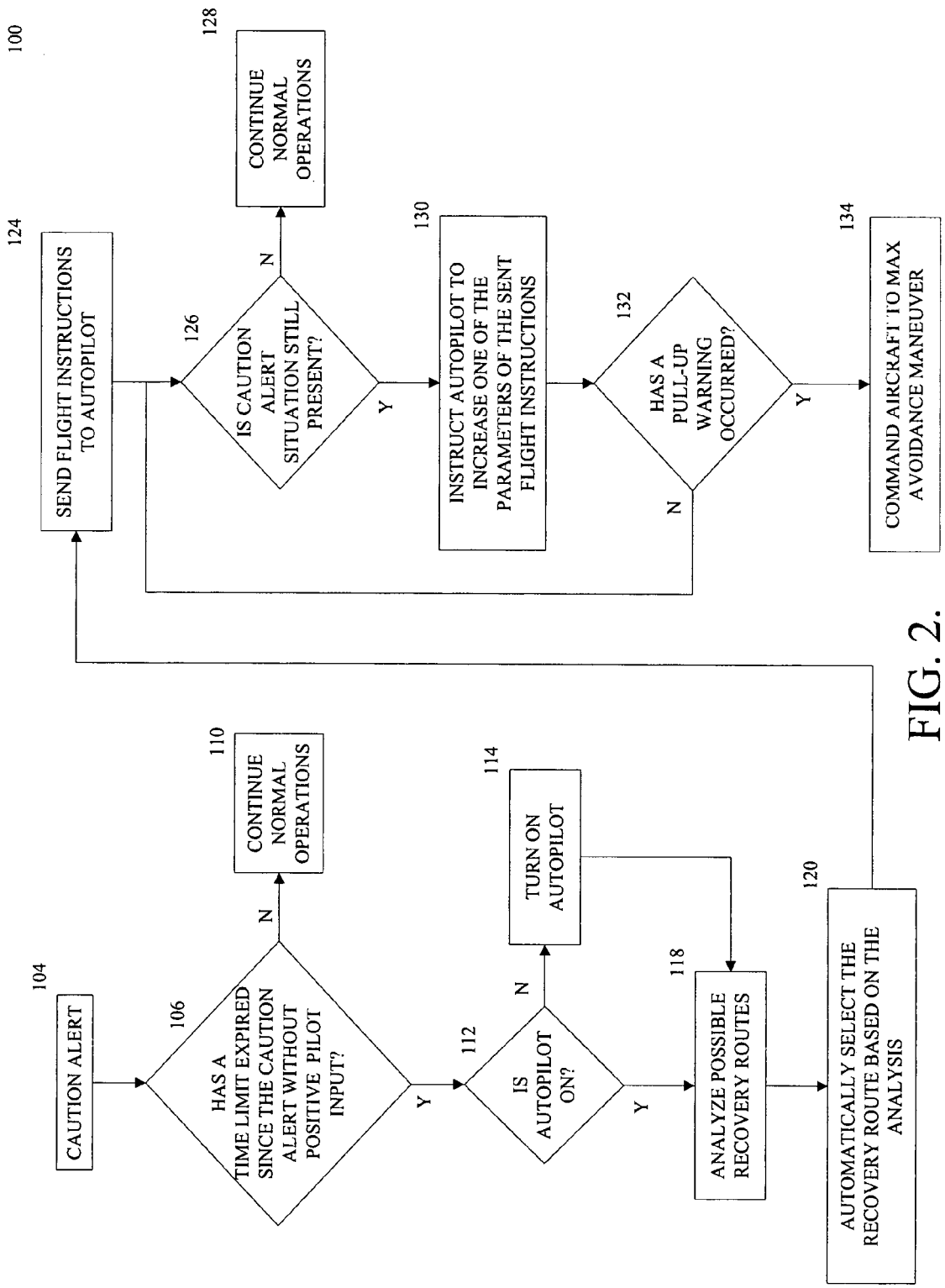
FIG. 2 illustrates a flow diagram performed by an auto-recovery component of the system shown in FIG. 1.

FIG. 2 illustrates a flow diagram of an exemplary process 100 performed by the auto-recovery system 24. First, the process 100 begins when a caution alert is outputted by the warning system 22, see block 104. At decision block 106, the auto-recovery system 24 waits until a time limit has expired since the caution alert has been identified without any positive flight control input by the pilots. A time limit or delay may be set at any value as determined by aircraft operations or preset by the manufacturer of the auto-recovery system 24. A time limit between 3–5 seconds allows for pilot reaction time without ignoring the impending hazard.

Figure 11:
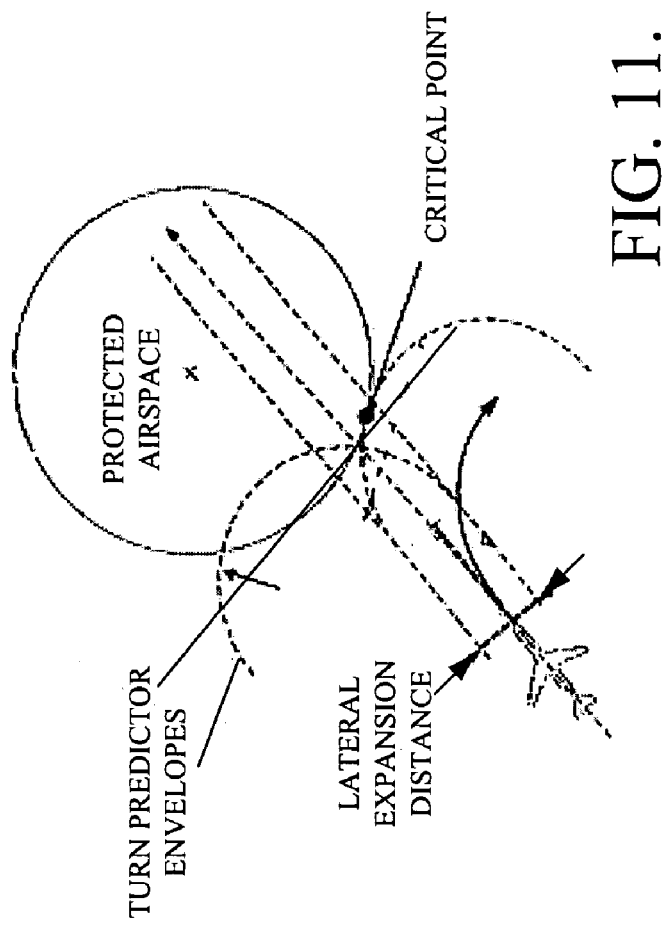
FIGS. 11 and 12 are illustrative examples of avoidance calculations with respect to different protected airspace volumes.
Figure 12:
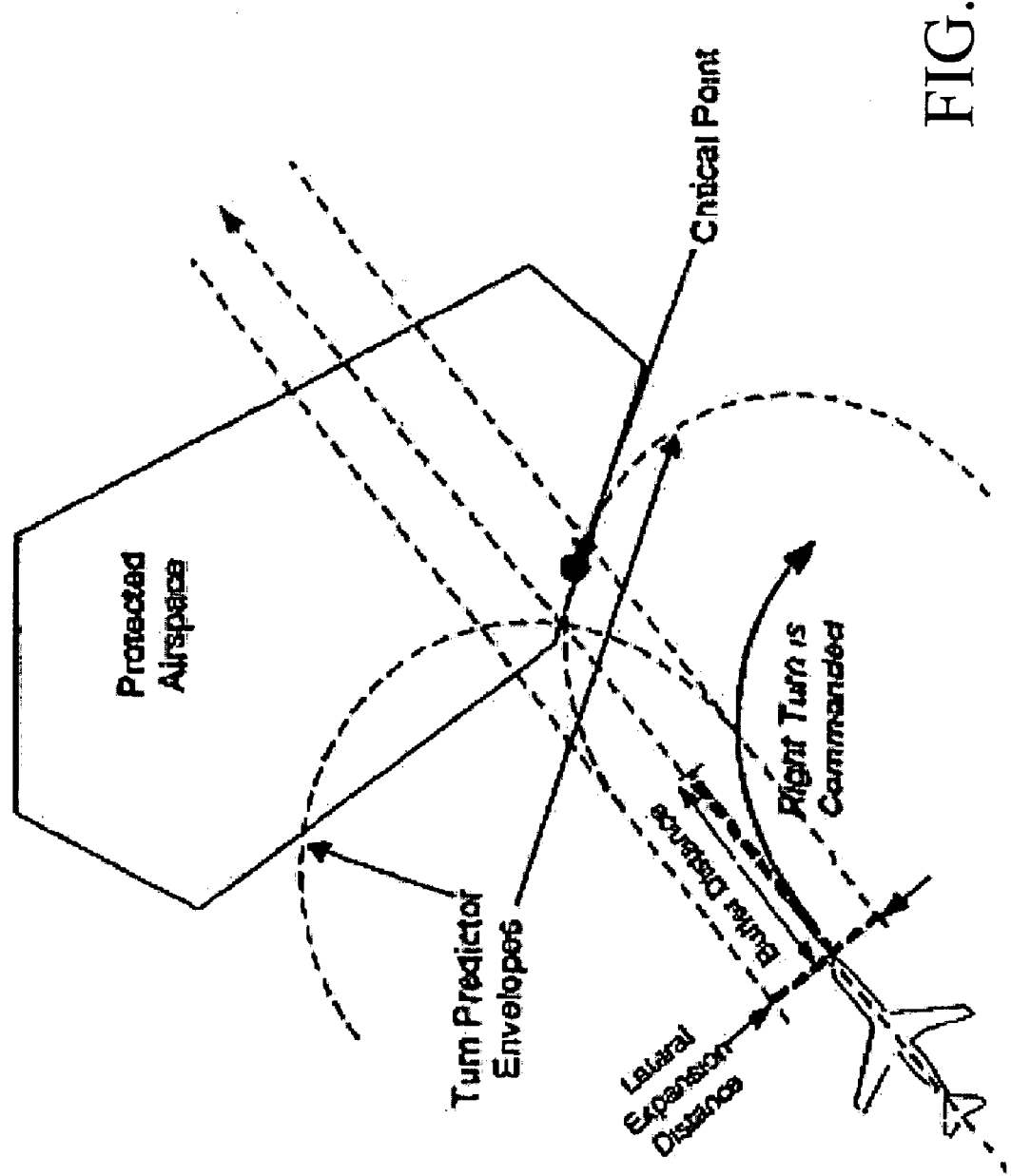

If the pilots have positively responded to the caution alert, then aircraft operates as normal, see block 110. A non-positive pilot response includes a lack of response or an incorrect response. In other words, the functions of the auto-recovery system 24 are not needed. If no positive pilot action occurred and the time limit has expired, the auto-recovery system 24 instructs the autopilot 36 to turn on, if the autopilot is not already on, see decision block 112 and block 114. At block 118, the auto-recovery system 24 analyzes possible recovery routes. Examples of possible recover routes include the following:

a) roll wings level, pull-up
b) left turn 15°
c) right turn 15°
d) left turn 30°
e) right turn 30°
f) any of b-e with a pull-up Other examples of different recovery routes are described in more detail below by example with regards to FIGS. 11–12.

At block 120, the auto-recovery system 24 automatically selects either the recovery route analyzed to have the best climb gradient or, if the recovery routes are analyzed sequentially, the first recovery route that is found to put the aircraft 20 in a trajectory that would clear the aircraft 20 of the impending hazard (ground, obstacle, protected airspace) is selected. Next, at block 124, the auto-recovery system 24 determines the proper flight instructions to give to the autopilot and then sends the flight instructions to the autopilot 36. Examples of the flight instructions that the auto-recovery system 24 sends to the autopilot 36 include pitch and roll commands, an airspeed value, flight path angle, or other instructions for directing the aircraft 20. If no caution alert is present after a set amount of time has passed since the auto-recovery system 24 has instructed the autopilot 36, decision block 126, normal operations of the aircraft resume, see block 128. If the caution alert is still present, then, at block 130, the auto-recovery system 24 instructs the autopilot to increase one or more of the flight instruction parameters that were sent to the autopilot 36. The decision at block 126 and the step at block 130 repeat, thereby increasing certain parameters such as flight path angle, until the pilot takes positive control of the aircraft or it is determined at decision block 132, that a warning has been identified by the warning system 22. If a warning has been identified, then at block 134 the auto-recovery system 24 instructs the autopilot 36 to perform maximum allowed avoidance maneuver. In one embodiment, maximum allowed maneuver is a six-degrees nose-level climb.

In one embodiment, the process 100 is performed or continued as long as the warning system 22 generates a high integrity flag. If a low integrity flag is sent from the warning system 22 to the auto-recovery system 24, the auto-recovery system 24 will not send flight control instructions to the autopilot 36 or fly-by-wire system 40. When the integrity flag is set high, the information that the warning system 22 uses to analyze aircraft proximity to the ground, obstacles, and protected airspace is of an acceptable standard. The acceptable standard ensures that when a caution or warning signal is identified, a false alert condition is highly unlikely. The caution or warning signal is highly accurate and that an auto-recovery initiated by the auto-recovery system 24 is an accurate response.

It will be appreciated that various types of flight instructions may be sent from the auto-recovery system 24 to the autopilot 36 or fly-by-wire system 40 depending upon the desired auto-recovery maneuver. For example, if the autorecovery system 24 is designed for use in a commercial aircraft, then the flight instructions that are sent to the autopilot 36 are preferably not going to cause drastic maneuvers that would cause alarm or injury to passengers or crew that are not seated with a seatbelt. In one embodiment, the pitch instruction that is sent to the autopilot 36 is a 2° nose-up pitch instruction. And at block 130, the increase is another 2° increase. These increases are designed to be effective but gradual and not to present large G-forces that are felt by the passengers.

With regard to the maximum allowed avoidance maneuver that occurs after a warning in a commercial aircraft, speed is preferably kept constant while the maneuver occurs. However, the instructions sent to the autopilot may be one that trades speed for altitude. In other words, a pitch instruction is so great that it causes a decrease in airspeed. One effective use of trading airspeed for altitude is when it is desirable to put the aircraft in a position that it reaches or nearly reaches its stall speed in order to produce the maximum amount of climb possible without causing the aircraft to depart stable flight.

Figure 3:
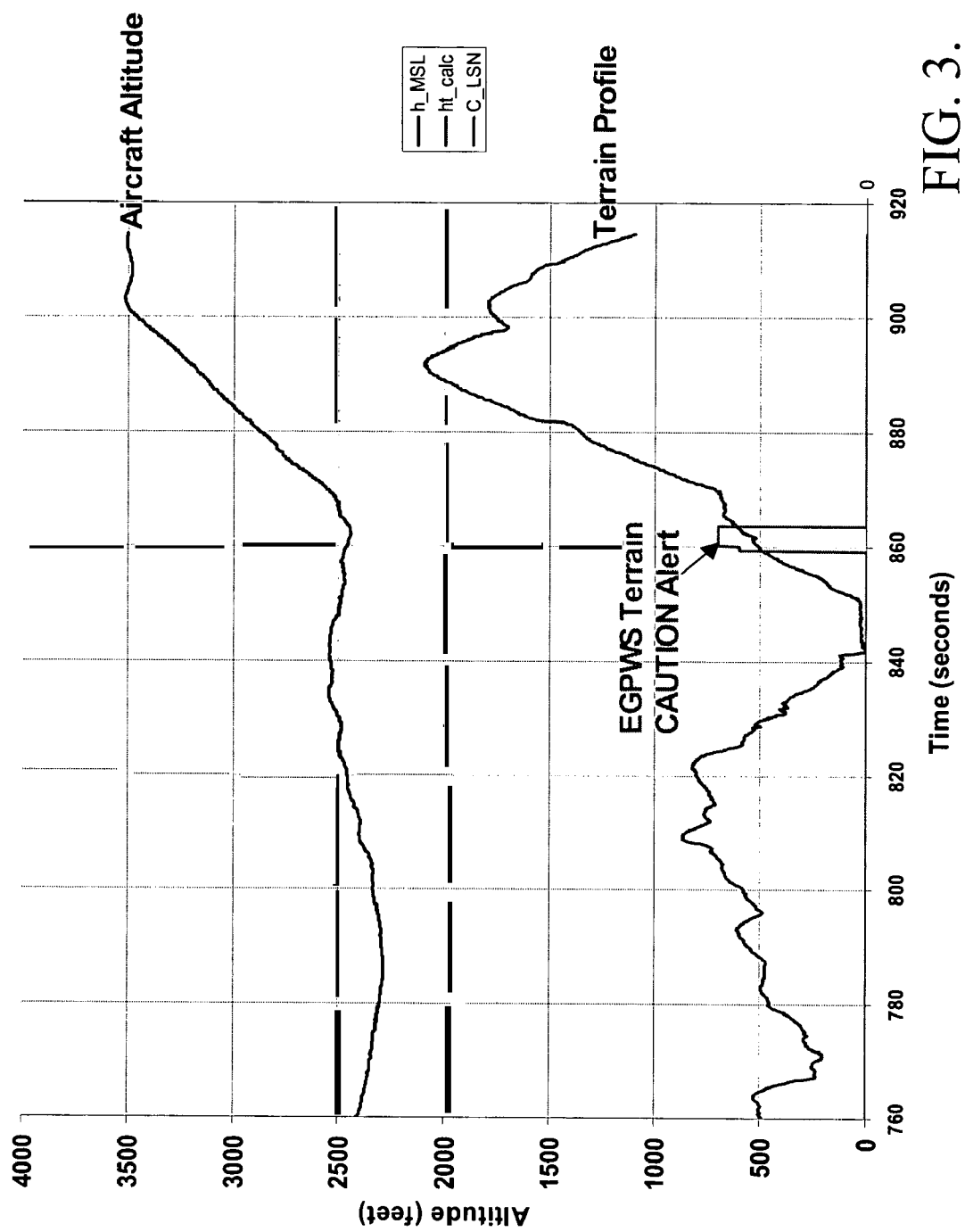
FIGS. 3–5 illustrate example data results of this aircraft information of an aircraft undergoing auto-recovery using the system shown in FIG. 1.
Figure 4:
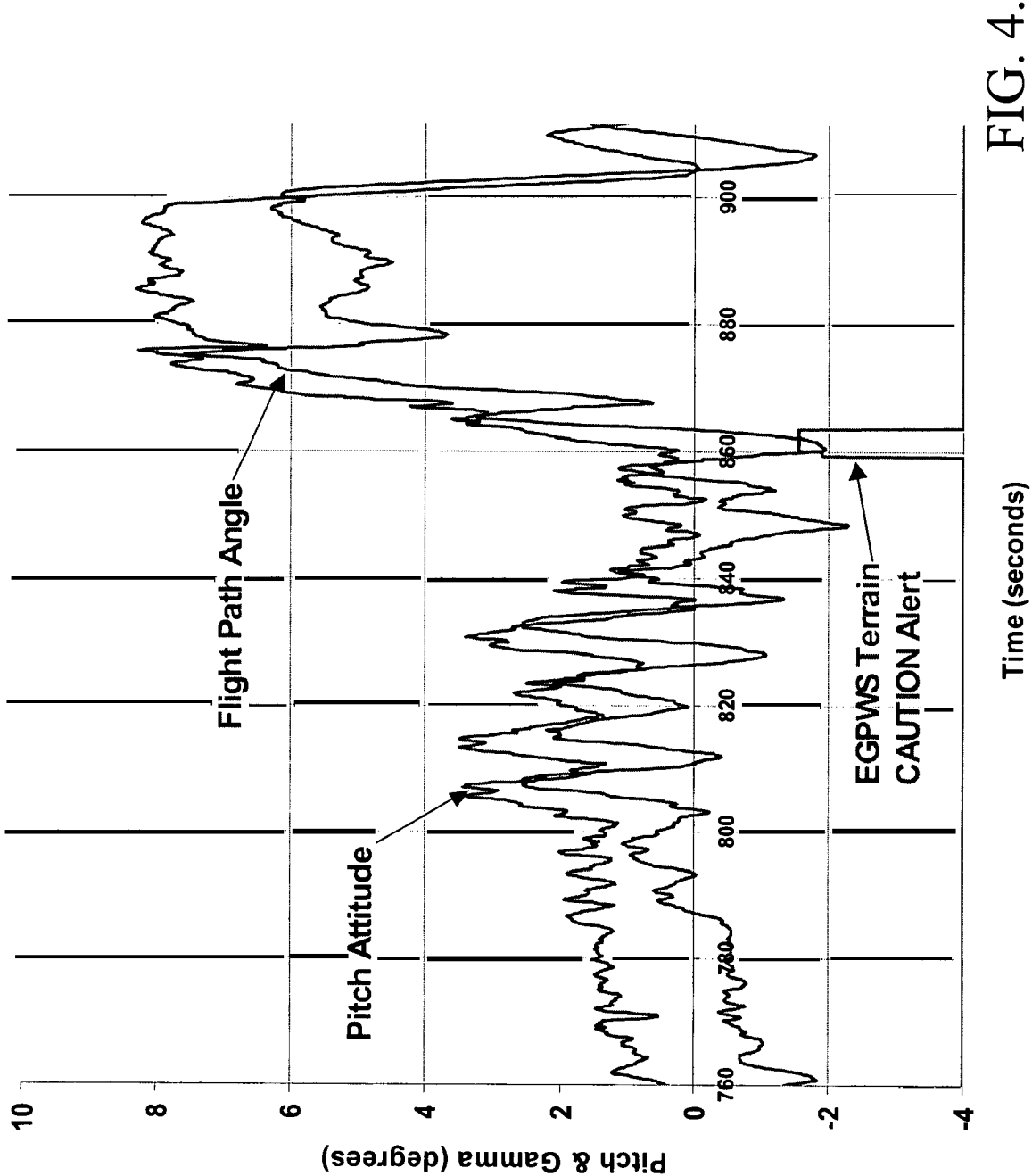
Figure 5:
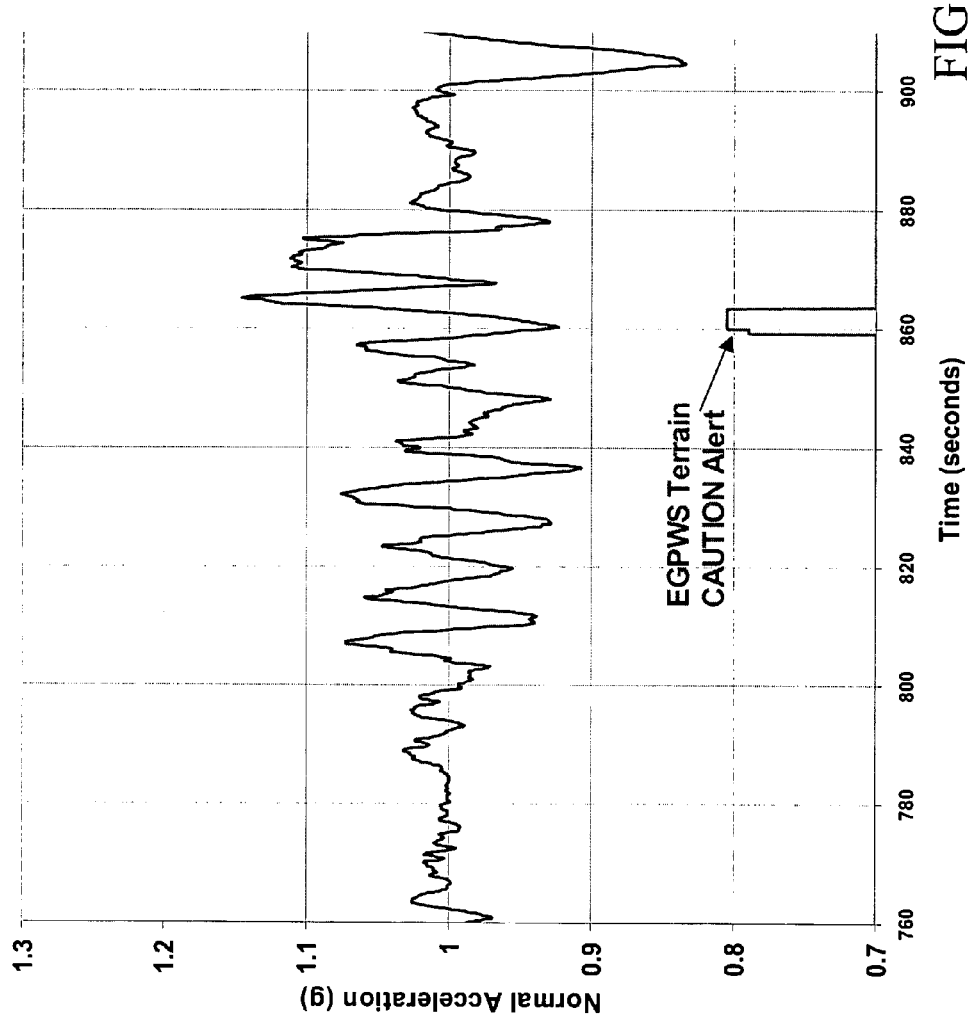

FIGS. 3–5 illustrate graphs showing data of a flight test of an aircraft implemented with the auto-recovery system 24 of the present invention. As shown in FIG. 3, caution alerts occur for an aircraft traveling at approximately 2,500 feet as it approaches a terrain feature that extends higher than 2000 feet as indicated by the terrain profile line. After the caution alert and no positive input by the pilot, the auto-recovery system 24 maneuvers the aircraft to a higher altitude. As shown in FIG. 4, the flight path angle of the aircraft is altered after the caution alert in order for the aircraft to gain altitude. The pitch attitude is also shown in FIG. 4. FIG. 5 illustrates aircraft G-forces experienced during the recovery maneuver.

Figure 6:
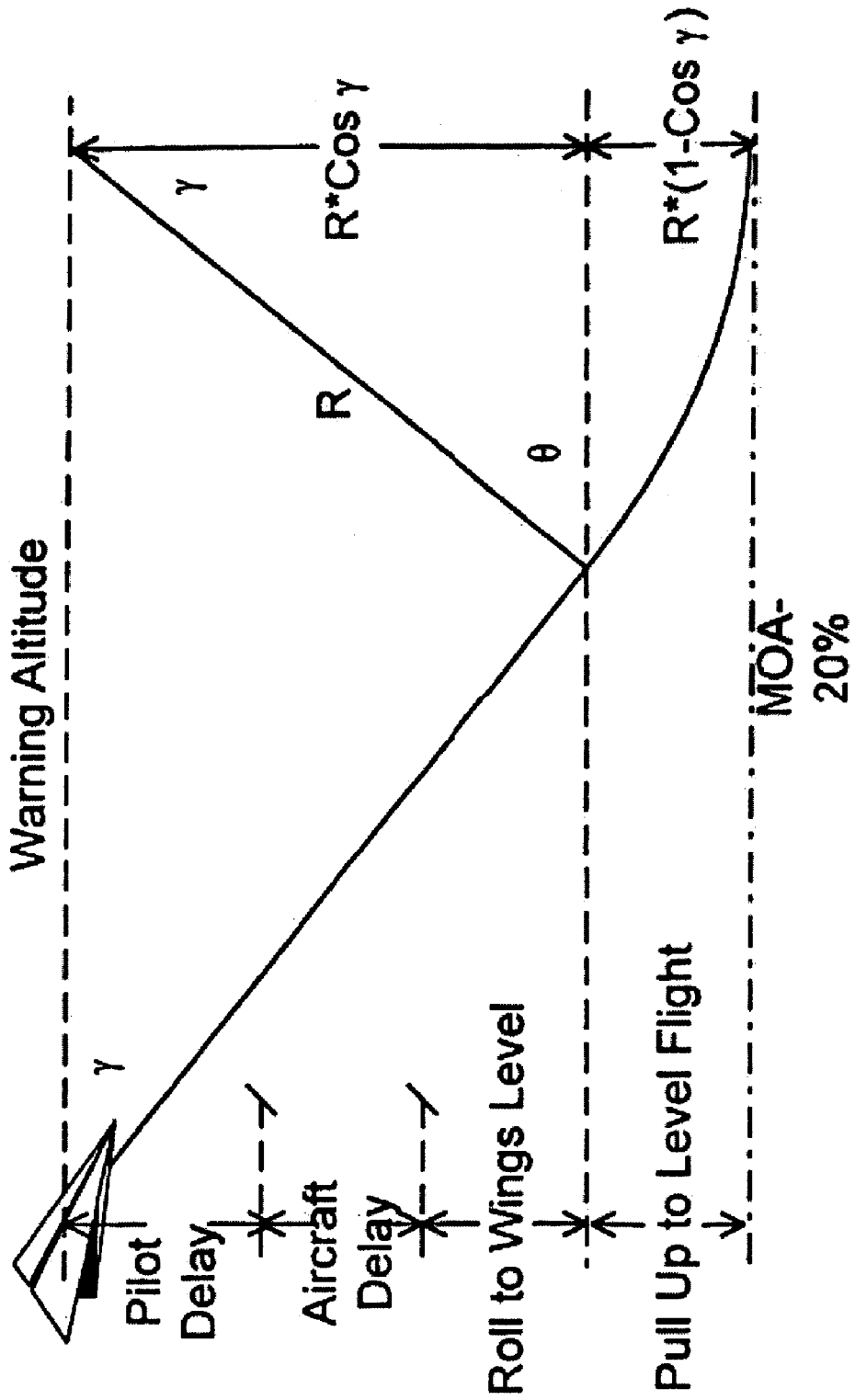
FIG. 6 illustrates a graphical representation of warning altitude geometric values generated in accordance with the present invention.

FIG. 6 illustrates an example alerting algorithm that augments a look ahead calculation that is performed by the warning system 20. A warning light is illuminated and an audible warning "Pull Up" is outputted when the warning system 22 determines that the aircraft is at a point set to whatever the desired g limit is for a recovery maneuver. The recovery maneuver is such to prevent the aircraft from going below a Minimum Operating Altitude (MOA) by a fraction of 0.2 or 20%.

The look ahead calculation is based on the sum of four separate altitude loss elements:

1) Pilot Response: Descent Rate times the time it takes a pilot to initiate corrective action after warning 2) Aircraft Response: Descent Rate times the time it takes the aircraft to respond to the pilot's control input 3) Roll to Wings Level: Descent Rate times the absolute value of Roll Attitude/Roll Rate Constant 4) Pull Up to Level Flight: Altitude lost with constant g maneuver until level flight (1.6 g).

The Pull Up to Level Flight element is based on the equation for centripetal acceleration in circular motion, $a=V^2/R$. Where V is the speed and R is the Radius of the circle. In a dive recovery, function V is ground speed and "a" is the number of G's in the pull up maneuver. The altitude lost during the pull up is calculated based on the Descent Rate and Ground Speed. Flight Path Angle ($\gamma$) is determined by Descent Rate/Ground Speed (both scaled to feet and seconds, answer is in radians). The radius (R) is calculated from centripetal acceleration as R=Ground Speed$^2$/1.6 g's. The amount of altitude lost from the current vertical position is calculated relative to the vertical position of the center rotation. The aircraft's vertical distance from the center of rotation at the start of the pull up is $R*\mathrm{Sin}(\theta)$. Since $\theta=90°-\gamma$, this distance is also $R*\mathrm{Cos}(\gamma)$. The altitude lost is the difference between R and $R*\mathrm{Cos}(\gamma)$, or $R*(1-\mathrm{Cos}(\gamma))$. Substituting for R, the final calculation (ignoring unit conversions) for altitude lost during the pull up is equal to (Ground Speed$^2*(1-\mathrm{Cos}\gamma))/1.6$ g's.

Figure 7:
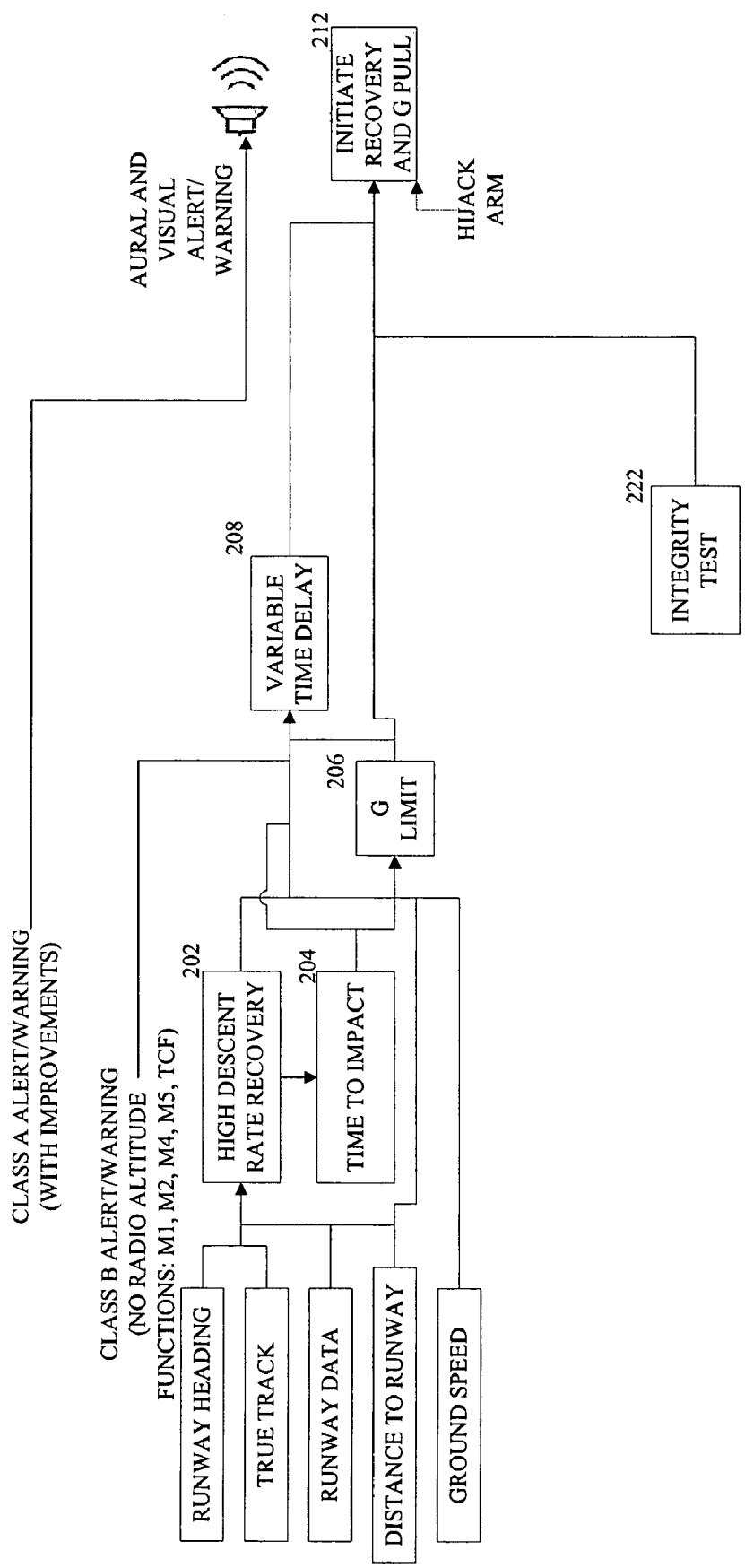
FIG. 7 illustrates a flow diagram of an alternate embodiment process performed by the system shown in FIG. 1.

FIG. 7 illustrates another auto-recovery method 200 that includes a high integrity test in order for auto-recovery to be initiated. At block 202, a high descent rate recovery is determined based on runway heading information, true-track information, runway data, and distance to runway information. The result of the high descent rate recovery determination is inserted into a block 204 where time to impact is calculated. The high descent rate recovery result, time to impact result, the distance to runway information, and ground speed are sent to a G-force calculator at a block 206 to determine if the recovery meets with predefined G-force limits (e.g. >15 nM (nautical miles)=1.16; 15 to 5 nM=1.156; <5 nM=1.25G). At block 208, a variable time delay is initiated upon the reception of a Class-B alert/warning, a result of the high descent rate recovery determination, the time to impact result, and the determined G-force limit. The Class-B alert/warning is generated by a ground proximity warning system that does not include Modes 1, 2, 4, or 5 and does not include terrain clearance floor (TCF)—the warning system only includes a look ahead algorithm, a dive recovery algorithm, and a height above field envelope. The results of block 208 and block 206 are sent to block 212 to determine if a recovery should occur.

An autorecovery occurs if an alert or warning is produced and the necessary time delay has occurred and the warning system 20 generates a positive signal from a system integrity test, see block 222. In another embodiment, a hijack arm (switch) must be activated in order for autorecovery to occur. Activation of the hijack arm cause the transponder to transmit a distress or hijack code.

The auto-recovery system 24 may also generate flight control signals that are sent to flight control actuators, a stick-pusher, or other devices that control motion of the aircraft. The stick-pusher is a device that is coupled to the control stick of the aircraft for controlling position of the control stick.

Figure 8:
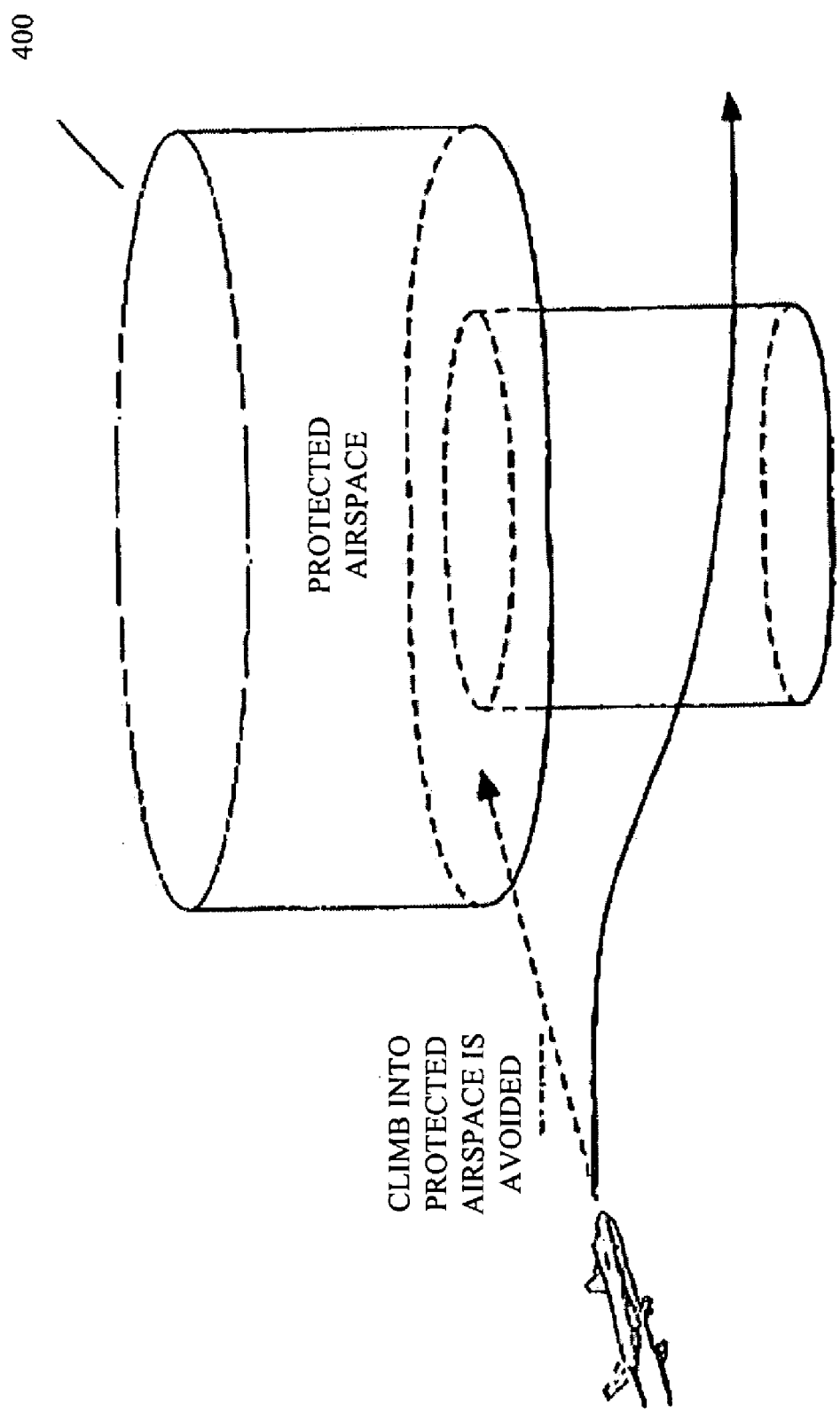
FIGS. 8 and 9 are perspective views of protected airspace volumes.
Figure 9:
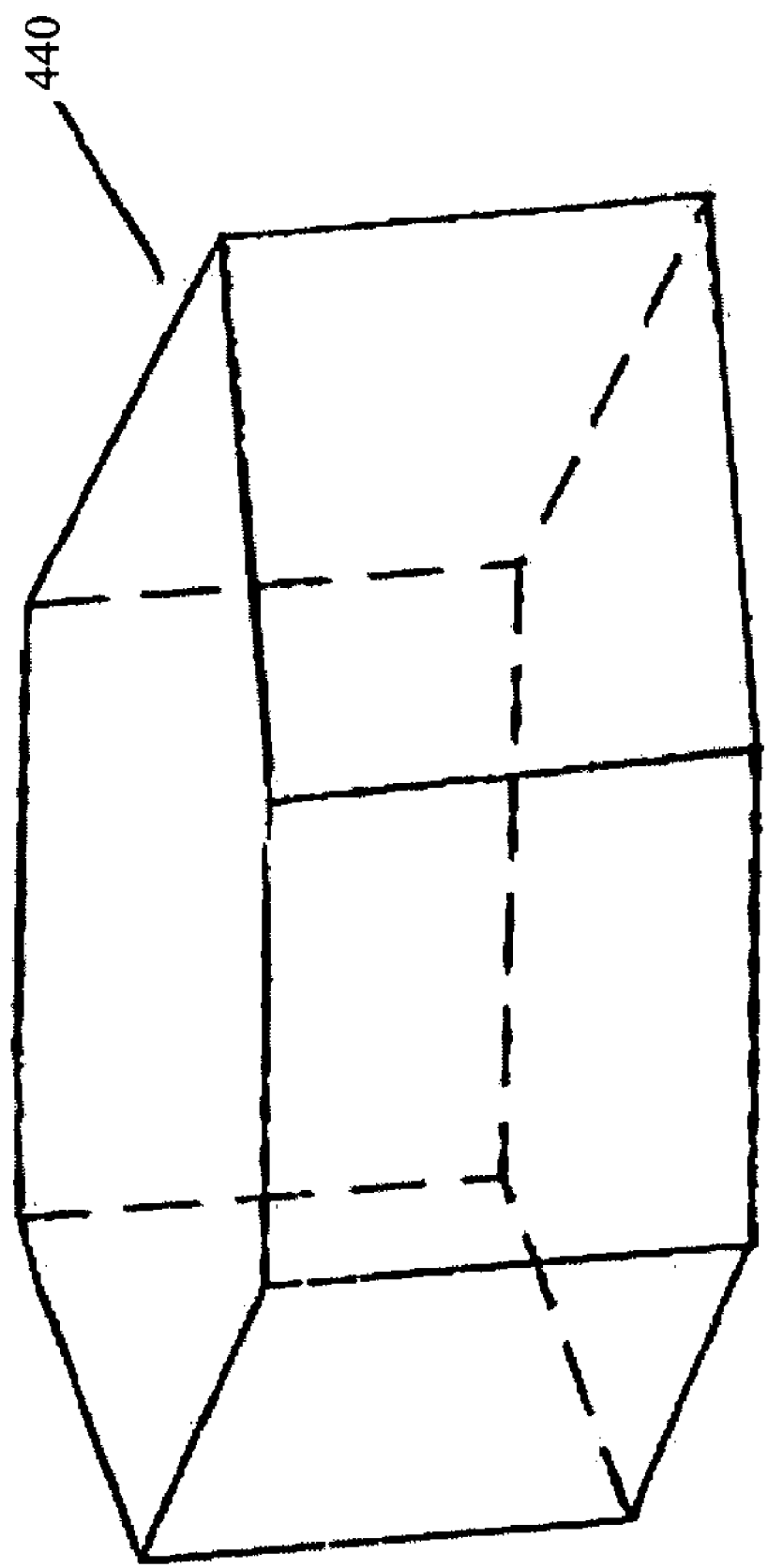
Figure 10:
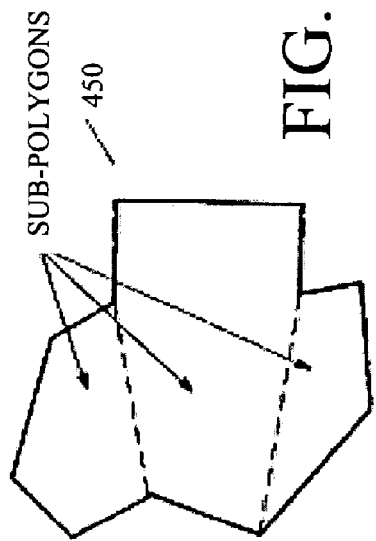
FIG. 10 is a top view of a multi-polygonal protected airspace volume.

The auto-recovery system 24 may include software or a combination of hardware and software that execute protected airspace alerting algorithms and maneuver algorithms. Protected Airspace may be represented by a series of vertical cylinders (see FIG. 8), by polygons (see FIG. 9), or by a combination according to the particular type of airspace. The cylindrical type of airspace, such as airspace 400 shown in FIG. 8, may be represented in the database 32 by the following parameters:

Latitude of center point
Longitude of center point
Number of layers
Radius of each layer
Ceiling elevation of each layer The polygonal type of airspace, such as airspace 440 shown in FIG. 9, may be represented in the database 32 by the following parameters:

Number of vertices
Latitude of each vertex
Longitude of each vertex
Ceiling elevation As shown in FIG. 10, a complex polygonal airspace 450, may be represented by a series of simple convex polygons.

In one embodiment the alerting algorithms of a protected airspace avoidance component at the auto-recovery system 24 include various aspects. For example, the recovery system 24 searches the database 32 for protected airspace volumes, which are within a lateral area±30° of the current track of the airplane. The lateral area degree value may be degree values other than 30°. For each of these nearby protected airspace volumes, recovery system 24 computes the coordinates (latitude and longitude) of an envelope which represents the nearest the airplane can approach, assuming it maintains its present track, and avoid the airspace by making a turn (at present airspeed and at 30° of bank angle) in the most favorable direction (see examples shown in FIGS. 11 and 12). The Alerting Envelopes are calculated by predicting the path that the airplane would take if it continued on its present heading for a time of 30 seconds, and then executed either a left or right turn at 30°, of bank at the present airspeed. The initiation points of the turns are set at a 'lateral expansion distance' to either side of the airplane position (see the 'turn predictor envelopes' in FIGS. 11 and 12). The alert is given when both left and right turn envelopes intrude into the airspace volume. For each airspace volume, using the known climb performance of the airplane, the ability of the airplane to climb above the volume is calculated, assuming that the climb is initiated at the boundary of the envelope computed in the previous step.

The commands to the pilot can be aural messages (e.g. "Turn Left", "Climb" "Turn Left and Climb"), supplemented by visual display of these messages on the flight instrument displays. The system also calculates the aircraft heading and altitude, which are required to clear the airspace volume, and these values may be sent to flight director, Head-Up Display or the automatic pilot.

FIG. 13 illustrates a system 500 that includes an EGPWS 510 that includes a database 520, an alerting algorithm component 522, and a maneuvering algorithm component 524. The database 520 includes geographic locations and horizontal and vertical extents of local protected airspace. The EGPWS 510 interfaces with airplane systems 530, 532 and 534 to provide knowledge of the airplane position (latitude, longitude, altitude), horizontal velocity, vertical velocity (or flight path angle) and track angle. Additionally, if guidance commands are desired, knowledge of airplane pitch attitude, roll attitude and heading may be required.

The alerting algorithm component 522 determines if the airplane is predicted to encroach on any protected airspace volume. The EGPWS 510 includes an aural message generator that provides audible information to the pilot after the alerting algorithm component 522 determined that there is imminent conflict with a protected airspace. The maneuvering algorithm component 524 generates guidance commands for output to the pilot or an automatic flight control system 540 for avoiding the protected airspace.

The present invention may be configured to allow a pilot to take control of the aircraft any time during an auto-recovery.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for performing auto-recovery for an aircraft, the aircraft includes position and information systems and an automatic flight control system, the apparatus comprising:
  memory for storing terrain data, airport data, obstacle data, and protected airspace data; and
  a processor coupled to the memory, the position and information systems, and the automatic flight control system, the processor comprising:
    a component for determining if one of a caution alert or a warning alert exists based on data stored in the memory and information received from the position and information systems;
    a component for waiting a predefined period of time for positive flight control input by the flight crew;
    a component for generating two or more auto-recovery routes; and
    a component for generating an auto-recovery instruction and sending the generated auto-recovery instruction to the automatic flight control system if no positive flight control input has been performed at time of expiration of the waiting period;
    wherein the component for determining includes a component for setting an integrity flag high or low and wherein the component for generating the auto recovery instruction sends the auto-recovery instruction to the automatic flight control system if the integrity flag is set high.

2. The apparatus of claim 1, wherein the component for analyzing possible recovery routes includes a component for selecting the first analyzed route that is determined to clear the caution or warning alert.

3. The apparatus of claim 1, wherein the component for analyzing possible recovery routes includes a component for automatically selecting the recovery route determined to have the best climb gradient.

4. The apparatus of claim 1, wherein the component for generating an auto-recovery instruction includes a component for initiating auto-recovery includes a means for increasing flight path angle by 2° if a caution alert is received.

5. The apparatus of claim 4, wherein the component for generating an auto-recovery instruction includes a component for initiating auto-recovery includes a means for increasing flight path angle by an additional 2° if the caution alert remains after expiration of an additional waiting period.

6. The apparatus of claim 1, wherein the component for setting an integrity flag sets the integrity flag based on validity information produced by the position and information systems and the memory.

7. The apparatus of claim 1, wherein the automatic flight control system includes an autopilot system.

8. The apparatus of claim 1, wherein the automatic flight control system includes flight control actuators.

9. The apparatus of claim 1, wherein the automatic flight control system includes a stick-pusher.

10. The apparatus of claim 1, wherein the component for generating an auto-recovery instruction includes a component for initiating auto-recovery includes a means for increasing flight path angle by 6° if a warning alert is received.

11. The apparatus of claim 1, wherein the automatic flight control system includes a fly-by-wire system.

12. A system for performing auto-recovery for an aircraft, the system comprising:
  aircraft position and information systems;
  an automatic flight control system;
  memory comprising terrain data, airport data, obstacle data, protected airspace data and an auto-recovery computer program product; and
  a processor coupled to the memory, the position and information systems, and the automatic flight control system, the processor comprising:

a component for determining if one of a caution alert or a warning alert exists based on data stored in the memory and information received from the position and information systems;
a component for generating two or more auto-recovery routes; and
a component for generating an auto-recovery instruction and sending the generated auto-recovery instruction to the automatic flight control system if no positive flight control input has been performed at time of expiration of a waiting period;
wherein the component for determining includes a component for setting an integrity flag high or low and
wherein the component for generating the auto recovery instruction sends the auto-recovery instruction to the automatic flight control system if the integrity flag is set high.

13. The system of claim 12, wherein the automatic flight control system includes flight control actuators.

14. The system of claim 12, wherein the automatic flight control system includes a fly-by-wire system.

15. The system of claim 12, wherein the automatic flight control system includes an autopilot system.

16. The system of claim 12, wherein the component for analyzing possible recovery routes includes a component for automatically selecting the recovery route determined to have the best climb gradient.

17. The system of claim 12, wherein the component for analyzing possible recovery routes includes a component for selecting the first analyzed recovery route that is determined to clear the caution or warning alert.

18. The system of claim 12, wherein the component for setting an integrity flag sets the integrity flag based on validity information produced by the position and information systems and the memory.

19. The system of claim 12, wherein the automatic flight control system includes a stick-pusher.

20. A computer program product residing on a computer readable medium for generating an auto-recovery instruction for an aircraft, the product comprising:
a component for determining if one of a caution alert or a warning alert exists based on one or more of terrain data, airport data, obstacle data, and protected airspace data stored in a memory, and information produced by aircraft position and information systems;
a component for waiting a predefined period of time for positive flight control input by the flight crew;
a component for generating two or more auto-recovery routes;
a component for generating an auto-recovery instruction if no positive flight control input has been performed at time of expiration of the waiting period; and
a component for sending the generated auto-recovery instruction to an automatic flight control system;
wherein the component for determining includes a component for setting an integrity flag high or low and wherein the component for generating the auto recovery instruction sends the auto-recovery instruction to the automatic flight control system if the integrity flag is set high.

21. The product of claim 20, wherein the component for analyzing possible recovery routes includes a component for selecting the first analyzed route that is determined to clear the caution or warning alert.

22. The product of claim 20, wherein the component for analyzing possible recovery routes includes a component for automatically selecting the recovery route determined to have the best climb gradient.

23. The product of claim 20, wherein the component for generating an auto-recovery instruction includes a component for initiating auto-recovery includes a means for increasing flight path angle by 2° if a caution alert is received.

24. The product of claim 23, wherein the component for generating an auto-recovery instruction includes a component for initiating auto-recovery includes a means for increasing flight path angle by an additional 2° if the caution alert remains after expiration of an additional waiting period.

25. The product of claim 20, wherein the component for generating an auto-recovery instruction includes a component for initiating auto-recovery includes a means for increasing flight path angle by 6° if a warning alert is received.

26. The product of claim 20, wherein the component for setting an integrity flag sets the integrity flag based on validity information produced by the position and information systems and associated with the terrain data.

27. A method comprising:
receiving one of a caution alert or a warning alert from a warning system;
waiting a predefined period of time for positive flight control input by the flight crew;
generating two or more auto recovery routes; and
initiating auto-recovery if no positive flight control input has been performed at time of expiration of the waiting period, wherein initiating auto-recovery includes generating two or more auto-recovery routes wherein receiving includes setting an integrity flag at one of a first or second value and wherein initiating initiates auto recovery if the integrity flag is set at the first value.

28. The method of claim 27, wherein initiating auto-recovery includes increasing flight path angle by 2° if a caution alert is received.

29. The method of claim 28, wherein initiating auto-recovery includes increasing flight path angle by an additional 2° if the caution alert remains after expiration of an additional waiting period.

30. The method of claim 27, wherein initiating auto-recovery includes increasing flight path angle by 6° if a warning alert is received.

31. The method of claim 27, wherein analyzing possible recovery routes includes:
selecting the first analyzed route that is determined to clear the caution or warning alert.

32. The method of claim 27, wherein analyzing possible recovery routes includes automatically selecting the recovery route determined to have the best climb gradient.

33. The method of claim 27, wherein initiating auto-recovery includes sending flight instructions to an autopilot system.

34. The method of claim 27, wherein initiating auto-recovery includes sending control signals to a fly-by-wire system.

35. The method of claim 27, wherein initiating auto-recovery includes sending control signals to flight control actuators.

36. The method of claim 27, wherein initiating auto-recovery includes sending control signals to a stick-pusher.

37. The method of claim 27, wherein the warning system includes an Enhanced Ground Proximity Warning System.

38. The method of claim 27, wherein the warning system includes an Enhanced Ground Proximity Warning System and a Protected Airspace Alerting System.

39. A system comprising:
- a means for receiving one of a caution alert or a warning alert from a warning system;
- a means for waiting a predefined period of time for positive flight control input by the flight crew;
- a means for generating two or more auto recovery routes; and
- a means for initiating auto-recovery if no positive flight control input has been performed at time of expiration of the waiting period,
- wherein the means for initiating auto-recovery generates two or more auto-recovery routes, wherein the means for receiving sets an integrity flag at one of a first or second value and wherein the means for initiating initiates auto recovery if the integrity flag is set at the first value.

40. The system of claim 39, wherein the means for initiating auto-recovery includes a means for increasing flight path angle by 6° if a warning alert is received.

41. The system of claim 39, wherein the means for analyzing possible recovery routes includes a means selecting the first analyzed recovery route that is determined to clear the caution or warning alert.

42. The system of claim 39, wherein the means for analyzing possible recovery routes includes a means for automatically selecting the recovery route determined to have the best climb gradient.

43. The system of claim 39, wherein the means for initiating auto-recovery includes a means for increasing flight path angle by 2° if a caution alert is received.

44. The system of claim 43, wherein the means for initiating auto-recovery includes a means for increasing flight path angle by an additional 2° if the caution alert remains after expiration of an additional waiting period.

45. The system of claim 39, wherein the warning system includes an Enhanced Ground Proximity Warning System and a Protected Airspace Alerting System.

46. The system of claim 39, wherein the warning system includes an Enhanced Ground Proximity Warning System.

47. The system of claim 39, wherein the means for initiating auto-recovery includes a means for sending control signals to a stick-pusher.

48. The system of claim 39, wherein the means for initiating auto-recovery includes a means for sending control signals to flight control actuators.

49. The system of claim 39, wherein the means for initiating auto-recovery includes a means for sending control signals to a fly-by-wire system.

50. The system of claim 39, wherein the means for initiating auto-recovery includes a means for sending flight instructions to an autopilot system.

* * * * *

UNITED STATES PATENT AND TRADEMARK OFFICE
CERTIFICATE OF CORRECTION

PATENT NO. : 7,098,810 B2  
APPLICATION NO. : 10/782055  
DATED : August 20, 2006  
INVENTOR(S) : Charles D. Bateman, John H. Glover and Steven H. Johnson It is certified that error appears in the above-identified patent and that said Letters Patent is hereby corrected as shown below:

On title page Item [75]  
One of the inventor's name should be spelled: John H. Glover Signed and Sealed this Tenth Day of April, 2007

JON W. DUDAS  
*Director of the United States Patent and Trademark Office*

UNITED STATES PATENT AND TRADEMARK OFFICE
CERTIFICATE OF CORRECTION

PATENT NO. : 7,098,810 B2  Page 1 of 1
APPLICATION NO. : 10/782055
DATED : August 29, 2006
INVENTOR(S) : Charles D. Bateman, John H. Glover and Steven H. Johnson It is certified that error appears in the above-identified patent and that said Letters Patent is hereby corrected as shown below:

On title page Item [75]
One of the inventor's name should be spelled: John H. Glover This certificate supersedes Certificate of Correction issued April 10, 2007.

Signed and Sealed this

Eighth Day of May, 2007

JON W. DUDAS
*Director of the United States Patent and Trademark Office*